United States Patent [19]

Retallick

[11] Patent Number: 5,252,299

[45] Date of Patent: Oct. 12, 1993

[54] CATALYTIC AIR CLEANER

[76] Inventor: William B. Retallick, 1432 Johnny's Way, West Chester, Pa. 19382

[21] Appl. No.: 889,250

[22] Filed: May 28, 1992

[51] Int. Cl.$^5$ .............................................. F01N 3/20
[52] U.S. Cl. ..................... 422/174; 422/199; 60/300; 60/320; 502/439; 502/527; 29/890; 29/DIG. 4; 55/520; 55/521; 55/522; 55/DIG. 30
[58] Field of Search ............... 422/173, 174, 198, 199; 55/492, 514, 520, 521, 522, DIG. 30; 60/300, 320; 502/439, 527; 29/890, 890.08, DIG. 4, DIG. 48

[56] References Cited

U.S. PATENT DOCUMENTS

| | | | |
|---|---|---|---|
| 3,768,982 | 10/1973 | Kitzner | 60/300 |
| 3,770,389 | 10/1973 | Kitzner | 60/300 |
| 3,979,193 | 9/1976 | Sikich | 55/123 |
| 4,040,253 | 8/1977 | Dhugues | 60/303 |
| 4,186,172 | 1/1980 | Scholz | 422/180 |
| 4,576,800 | 3/1986 | Retallick | 502/439 |
| 4,665,051 | 5/1987 | Nonnenmann | 502/439 |
| 4,711,009 | 12/1987 | Cornelison et al. | 29/157 R |
| 4,911,894 | 3/1990 | Retallick | 422/174 |
| 4,928,485 | 5/1990 | Whittenberger | 60/300 |
| 4,976,929 | 12/1990 | Cornelison et al. | 422/174 |
| 5,070,694 | 12/1991 | Whittenberger | 422/174 |
| 5,094,074 | 3/1992 | Nishizawa et al. | 60/300 |
| 5,140,812 | 8/1992 | Cornelison et al. | 60/300 |

*Primary Examiner*—Lynn M. Kryza
*Attorney, Agent, or Firm*—William H. Eilberg

[57] ABSTRACT

A catalytic air cleaner purifies air in enclosed spaces, such as in an aircraft or spacecraft. The air cleaner includes a pair of metal strips, wound into a double spiral. The strips have projections, affixed to the strips, to maintain the spacing between turns of the spiral. The spiral defines a core which accommodates an electrically heated catalytic converter. The strips themselves have no catalyst coating. A pair of ports at the periphery of the spiral allows air to enter and leave the spiral through inlet and outlet channels. Air entering the spiral through the inlet channel receives heat, by heat exchange, from air leaving the spiral, and then enters the core, where the electrically heated catalytic converter burns off various impurities. The air then leaves the spiral through the outlet channel, and becomes cooled by transferring its heat to the incoming air.

17 Claims, 4 Drawing Sheets

CATALYTIC AIR CLEANER

BACKGROUND OF THE INVENTION

This specification discloses a catalytic air cleaner that can purify the air in an enclosed area, such as in an aircraft or a spacecraft, or in other environments.

The present invention represents an improvement over U.S. Pat. No. 4,911,894, which describes in detail the theory of operation of a spirally-wound catalytic air cleaner. This specification hereby incorporates by reference the disclosure of the above-cited patent. That theory applies also to the catalytic air cleaner of the present invention.

The catalytic air cleaner of U.S. Pat. No. 4,911,894 comprises a double spiral formed from two strips of metal foil wound together to form two flow channels, one leading into the core of the spiral, and the other leading out. A combustion catalyst coats the strips of foil. The incoming air stream receives heat by heat exchange with the outgoing air stream, and also from a heater located in the core of the spiral. Catalytic combustion occurs on the surfaces of the strips.

While the catalytic air cleaner of the above-cited patent works well in theory, practical problems arise in building it. These problems have manifested themselves only after the filing date of the above-cited patent. The following paragraphs summarize the problems encountered in making the patented catalytic air cleaner.

In one method of making the air cleaner, one begins with the two strips of metal foil that form the spirals in the finished product. One lays these strips out on the floor, and attaches a strip of spacer along each edge of a strip, using sodium silicate solution as the adhesive. The insulation known as MIN-K super insulation, available from Manville Corp., can serve as the spacer. This insulation has a thermal conductivity as low as that of still air, and thus only half the conductivity of good commercial insulation. When one winds the two strips of foil together to form a spiral, the strips of spacer hold adjacent turns of the spiral apart, and define the side walls of the spiral passages. One seals the end faces of the spiral with the silicone rubber sold under the name RTV-60, available from the General Electric Company. The rubber takes the form of a viscous liquid which one can apply with a brush. The rubber vulcanizes at room temperature (hence the name "RTV", for "room temperature vulcanization") and joins the turns of the spiral and the strips of spacer into a rigid structure.

This silicone rubber cannot withstand a steady state temperature higher than about 260° C., which represents the approximate upper limit for all silicones. But the temperature of the core heater can reach 600° C., which causes the temperature on the face of the spiral nearest the core to exceed 260° C. Insulation of the faces of the spiral makes such elevated temperatures especially likely. On the other hand, if one does not insulate the faces of the spiral, the heat loss becomes prohibitive. The MIN-K super insulation might not prevent overheating on the face even if the insulation had zero conductivity, because the metal foil forming the spiral will itself conduct heat to the face.

In a variation of the above-described construction, one uses ceramic cement to seal the turns of the spiral close to the core. This variation did not succeed because the cement cracked and developed leaks.

Another method of making the patented catalytic air cleaner involves vacuum brazing. In this method, one seeks to attach end closures to the spiral before coating the spiral with catalyst. Thus, the foil defining the turns of the spiral would initially comprise bare metal. One must do the brazing before applying the catalyst for two reasons. First, the high temperature of the vacuum brazing would deactivate the catalyst. Secondly, the activated alumina in the coating would evolve occluded gases and make it impossible to generate the high vacuum needed for brazing.

Before performing the brazing, one winds the metal strips on a spacer of graphite felt. Graphite does not evolve gas at high temperature and high vacuum. Then one brazes wire screens, instead of solid metal sheets, over the ends of the spiral. One can burn out the graphite spacer by holding the brazed spiral in a furnace at about 800° C. Next, one applies the catalyst in the following manner. One dips the spiral into a slurry of activated alumina, and spins off the excess slurry by spinning the spiral about an axis perpendicular to the axis of the spiral. The excess slurry passes through the screen. One applies several coats of alumina in this manner, drying and calcining each coat. Then, one applies the platinum metal catalyst, in a water solution, in the same way. Finally, one seals the screen by painting it with ceramic cement.

In the brazing step, the edge of the foil does not make a continuous line seal with the screen, but instead it makes an interrupted seal with the wires of the screen. In this method, one hopes that sealing the screen with ceramic cement will form a continuous seal with the foil. In practice, this has not happened, so that air leaks between the turns of the spiral, and some of the inlet air never reaches the core.

In summary, neither of the above-described methods of construction has proved practical. Constructing a spirally-wound catalytic air cleaner, where the turns of the spiral bear catalyst before attachment of the end closures, has proved more difficult than anticipated.

The present invention solves the above-described problems by providing a more practical construction for the catalytic air cleaner. In the present invention, the turns of the spiral do not have a catalyst coating at all, and all of the catalytic combustion occurs at the core of the spiral. Thus, it becomes possible to seal the ends of the spiral without deactivating a catalyst by exposing it to high temperatures.

SUMMARY OF THE INVENTION

The catalytic air cleaner of the present invention includes two strips of metal wound into a double spiral. Unlike the device of the above-cited patent, the strips themselves have no catalyst coating, but instead comprise only bare metal. The strips also have a plurality of projections, arranged in rows, and preferably welded to the strips. The projections maintain the spacing between turns of the spiral, while allowing gas to flow substantially unimpeded through the spiral. A pair of metal end closures seal the ends of the spiral. One preferably attaches the end closures to the spiral by vacuum brazing. An electrically-heated catalytic heater sits in the hollow core of the spiral. This heater may comprise metal foil coated with catalyst, and means for resistively heating the foil. Openings in one or more of the end closures provide access to the core for insertion of the catalytic heater, and for entry and exit of the air that passes through the spiral.

The present invention therefore has the principal object of providing a catalytic air cleaner, formed from a pair of metal strips wound into a spiral.

The present invention has the further object of making it possible to seal the end closures of a spirally-wound catalytic air cleaner without causing deactivation of a catalyst.

The present invention has the further object of providing a practical and economical construction for a spirally-wound catalytic air cleaner.

The person of ordinary skill in the art will recognize other objects and advantages of the present invention, from a reading of the following brief description of the drawings, the detailed description of the invention, and the appended claims.

DETAILED DESCRIPTION OF THE INVENTION

Figure 1:
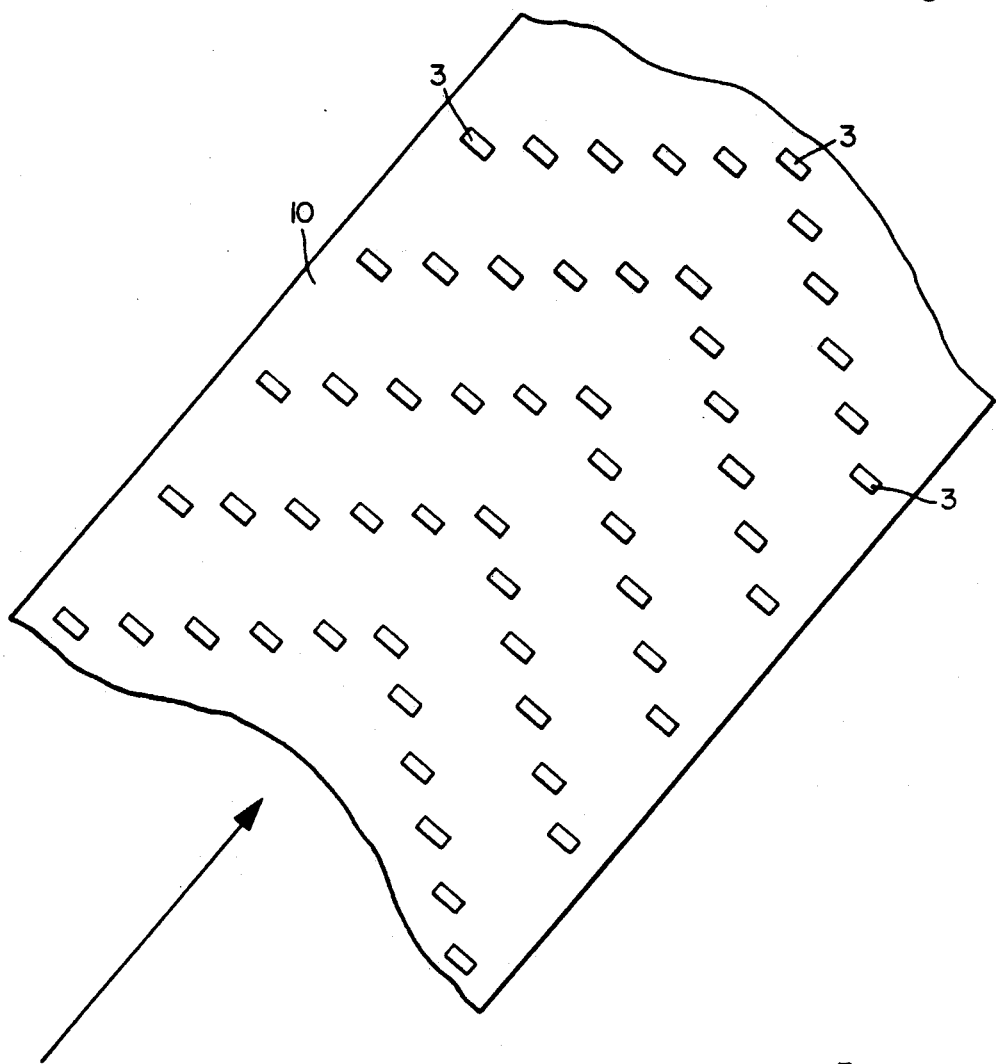
FIG. 1 shows a plan view of a metal strip used in the present invention to form the spirally-wound catalytic air cleaner.

FIG. 1 shows a plan view of a fragment of a strip 10 of metal, ready for winding into a spiral. The strip has rows of projections 3, affixed to the strip, to maintain the spacing between adjacent turns of the spiral.

Figure 2:
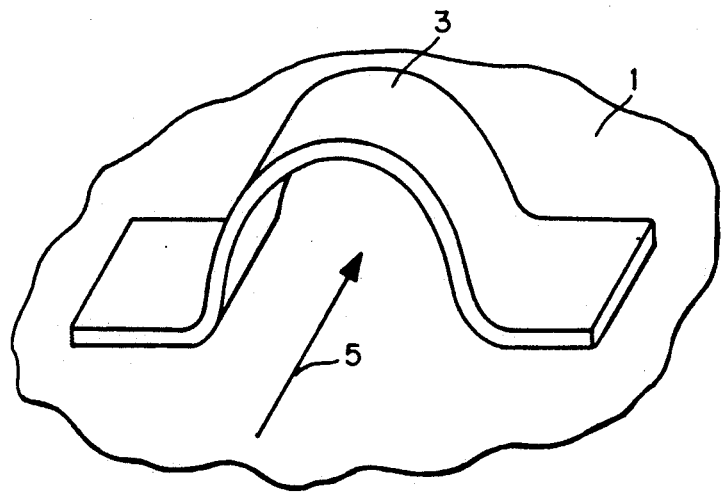
FIG. 2 shows a perspective view of a fragment of the metal strip, illustrating one of the projections affixed to the strip.

FIG. 2 provides a perspective view of one of the projections 3. Arrow 5 indicates the direction of gas flow through the projection. The projections have the shape of an arch which presents the edge of the arch to the flow of air. Thus, the projection does not substantially impede the flow of air through the spiral.

Preferably, one fastens the projections to the strip by spot welding. Note that the strip still comprises a solid sheet of metal; the projections do not affect the integrity of the strip. One can also attach the projections to the strip by other methods, within the scope of the invention.

The projections form rows having a non-perpendicular relationship to the longitudinal axis of the strip. One can make the rows incline at an oblique angle to the axis of the strip, or one can provide the rows in chevrons having a center line coinciding with that axis. FIG. 1 shows the case wherein the rows define chevrons. The rows of chevrons preferably overlap so that the projections maintain the spacing between turns of the spiral everywhere along the length of the strip. In the case of the chevrons, the overlapping means that the apex of a given chevron extends into the next chevron. In the general case, one should preferably arrange the projections, whether chevrons or straight rows, such that any line extending across the strip and perpendicular to the longitudinal axis of the strip will intersect at least one row of projections (although not every such line need actually intersect a projection). Clearly the arrangement of FIG. 1 satisfies the latter condition.

Figure 3:
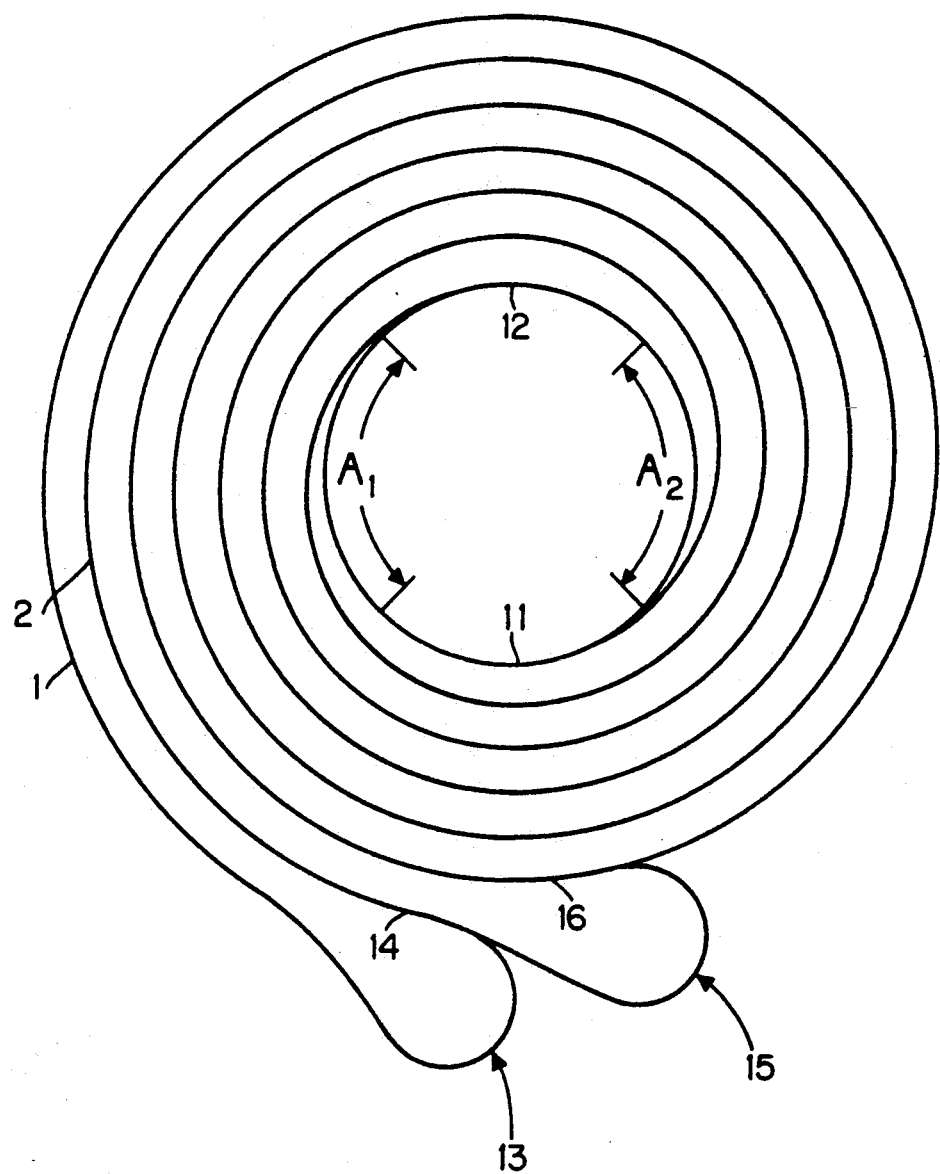
FIG. 3 shows a simplified end view of the catalytic air cleaner, with the end closures removed to make the turns of the spiral visible.

FIG. 3 shows an end view of the catalytic air cleaner of the present invention. For simplicity of illustration, FIG. 3 does not show the projections. Also, FIG. 3 does not show the end closures which cover the turns of the spiral. Also for clarity of illustration, FIG. 3 shows a spiral with only three turns. Of course, one can form the spiral with many more turns than three, and the present invention includes spirals having any number of turns.

Strips 1 and 2 define the spiral. Strip 1 terminates at its inner end at point 11, where it joins strip 2 along a weld running across the width of the strip. Thus, the weld runs along a line perpendicular to the plane of the paper in FIG. 3. Likewise, strip 2 terminates at point 12, where it joins strip 1 along a similar weld. The welds define seals for the strips. Together the two strips join to form a cylindrical shell at the core of the spiral.

In an alternate construction, one could form the cylindrical shell as a separate piece to which one welds the strips at points 11 and 12. The present invention includes this alternative.

One forms a cut-out in the cylindrical shell along the arc designated $A_1$, and another cut-out along the arc designated $A_2$ to form an entry to and an exit from the core. One places these cut-outs near opposite ends of the spiral. Thus, in the view of FIG. 3, if one locates the cut-out along arc $A_1$ nearer to the reader, then one places the cut-out along arc $A_2$ at a position farther from the reader, and vice versa. One can make the cut-outs in the form of simple rectangular openings in the strip, or one can form them in other shapes.

The outer end of strip 1 includes a curl which defines loop 13. One seals the outer end of strip 1 to strip 2 at point 14. Likewise, the outer end of strip 2 includes a curl defining loop 15, and one seals the strip 2 to strip 1 at point 16.

Figure 4:
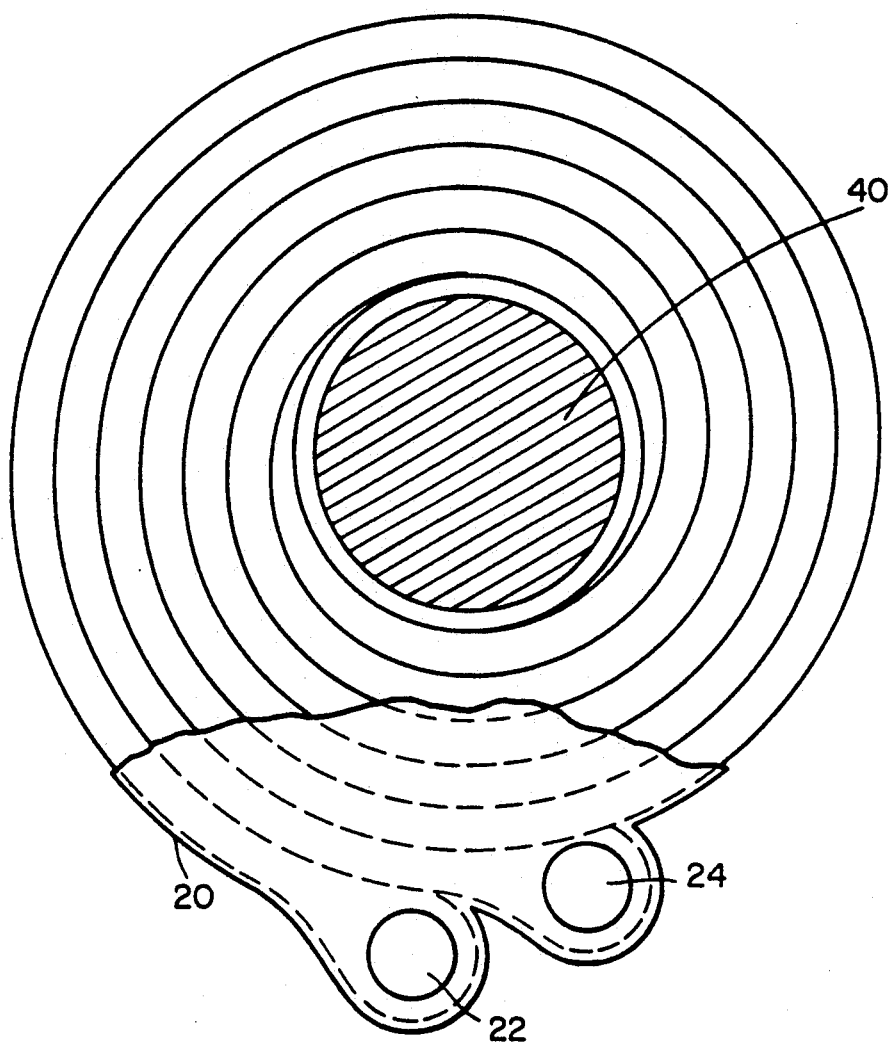
FIG. 4 shows an end view of the catalytic air cleaner, with the end closures broken away, and showing inlet and outlet ports for connection of the gas stream to the outside, and also showing the heater inserted into a central opening in an end closure.
Figure 7:
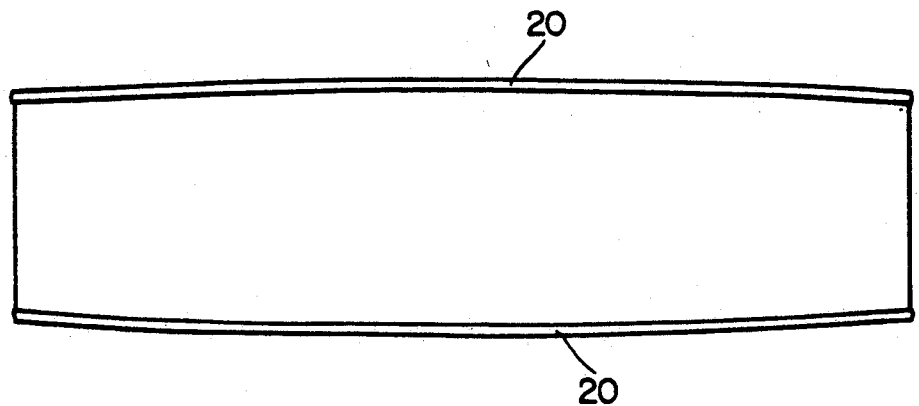
FIG. 7 shows an end view of the catalytic air cleaner, showing end closures on both sides.

FIG. 4 provides a view similar to that of FIG. 3, except that FIG. 4 also shows part of an end closure 20 which covers and seals one end of the spiral. The air cleaner has a similar end closure on its opposite end. FIG. 7 shows an end view illustrating both end closures. The end closures preferably comprise solid sheets of metal, and one can attach them to the spiral by vacuum brazing. The end closure 20 visible in FIG. 4 has holes aligned with loops 13 and 15. These holes define ports 22 and 24 which allow gas to enter and leave the spiral.

An electrically heated catalytic heater ("EHC") 40 sits in the core of the spiral, between the above-described cut-outs. End closure 20 has a central opening for insertion or replacement of EHC 40. In the preferred embodiment, the ports and the central opening appear on the same end closure, for ease of manufacturing.

Figure 6:
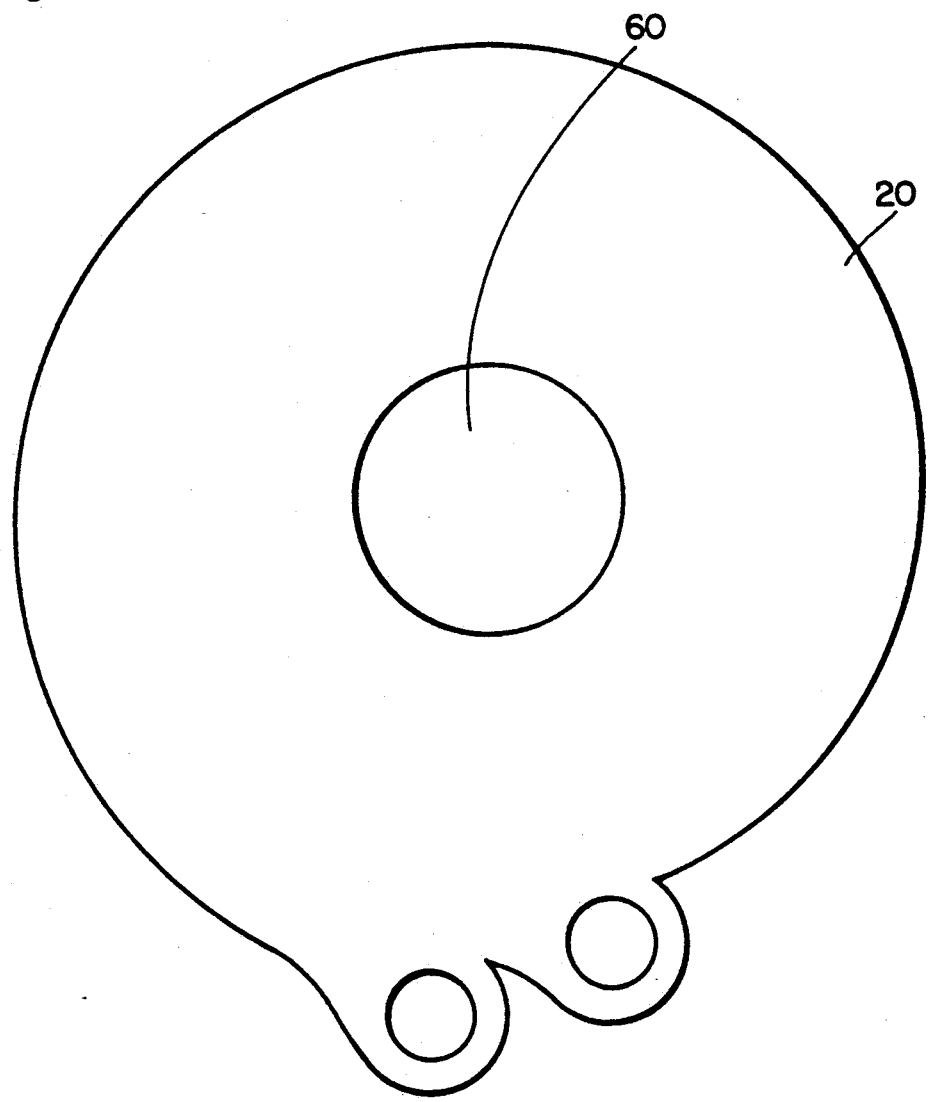
FIG. 6 shows a plan view of one of the end closures for the catalytic air cleaner, the figure showing the opening which provides access to the core of the spiral.

The central opening (element 60 in FIG. 6) in the end closure 20 has a diameter slightly smaller than that of the cylindrical shell formed by the strips at the core of the spiral. Thus, end closure 20 overlaps and seals the walls of the shell. A layer of filler, such as ceramic felt, occupies the portion of the cylindrical shell, between the cut-outs. This filler seals the EHC to the walls of the shell, so that all of the air flows through the EHC. A cover attached to the end closure (not shown) closes off the central opening, and itself provides openings for electrical leads to the EHC. One may secure the EHC to the cover by one or more struts (not shown) which hold the EHC in position.

For the catalytic heater 40, one preferably uses an electrically heated converter (EHC), such as manufactured by Camet Company of Hiram, Ohio. U.S. Pat. Nos. 4,928,485, 4,976,929, and 5,070,694 describe such an electrically heater converter. This specification hereby incorporates by reference the disclosures of all the above-cited patents. In essence, the EHC described above includes metal foil, coated with catalyst, and connected to a voltage source. The metal foil itself serves as a resistance heater, bringing the catalyst up to operating temperature.

In operation, one designates one of the ports 22 and 24 as the inlet port and the other as the outlet port. Suppose that port 22 (corresponding to loop 13 of FIG. 3) comprises the inlet port. Air entering through port 22 flows through the inlet channel defined by the spiral, and reaches the core via the cut-out at arc $A_1$. This air flows axially through the core, through heater 40 and into the cut-out at arc $A_2$. The air then flows through the outlet channel, and through outlet port 24.

The air flowing towards the core becomes heated by heat exchange with the heated air flowing away from the core in the adjacent passages of the spiral. When the incoming air reaches the core, the electrically heated catalytic converter heats this air further, and burns out the combustible contaminants in the air. The air then flows outward through the spiral. Heat exchange with the incoming air cools the outgoing air.

The flow of air causes a pressure drop through the spiral. This pressure drop tends to cause the walls of the ingoing turns of the spiral to bulge in both radial directions and thereby to constrict the outgoing turns. Such constriction would increase the pressure drop. But the projections prevent the bulging and the constricting, and thereby minimize the pressure drop.

One could also prevent the bulging and constricting by increasing the thickness of the strips that form the spiral, but to do so would add more weight than the weight of the projections. Since one especially intends to use this air cleaner in aircraft, where one must always minimize weight, the preferred embodiment includes a relatively thin strip having the projections described above. Also, one prefers titanium as the metal for making the air cleaner.

As used in this specification, the term "titanium" also includes alloys of titanium. The National Aeronautics and Space Administration (NASA) uses titanium alloys to construct a "sandwich" comprising a metal honeycomb positioned between two face sheets, analogous to the end closures of the present invention. The titanium alloy used for the honeycomb includes 3% aluminum and 2.5% vanadium, the balance comprising titanium. The alloy used for the face sheets includes 14% aluminum and 21% niobium, the balance comprising titanium. One could make the air cleaner of the present invention with these same alloys.

The term "vacuum brazing", as used in this specification, includes several techniques. The first technique includes coating the surfaces, which one desires to join together, with a metal having a melting point below that of the metal forming either surface. One applies the low melting metal in the form of a paste which contains a metal powder and a flux. For vacuum brazing titanium, the powder would contain silver, copper, and titanium.

A second technique, developed by NASA for bonding titanium alloys to make the sandwiches described earlier, bears the name "enhanced diffusion bonding" (EDB). In this method, one electroplates copper onto one of the surfaces which one desires to join together. Upon heating of the junction that will form a bonded joint, the copper and titanium form a liquid phase of Cu-Ti eutectic. As one holds the joint at a constant temperature, copper diffuses into the metal surrounding the joint, so that the composition at the joint becomes non-eutectic, and the joint solidifies. Holding the temperature constant for an extended period levels the concentration gradients around the joint, and strengthens the joint thereby. The foregoing defines the essence of EDB.

Figure 5:
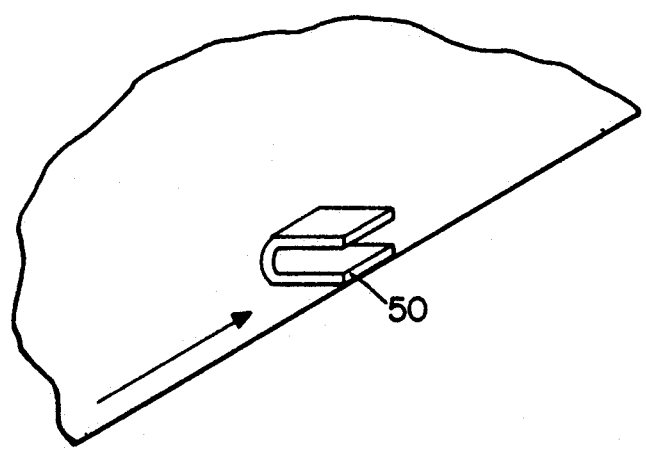
FIG. 5 shows a fragmentary perspective view of a portion of a strip used to make the spiral, the strip having a plurality of U-shaped projections.

When one brazes the end closures to the turns of the spiral, one must form a continuous seal between the turns and an end closure. Otherwise, gas will not travel along the intended spiral channel. To insure an absolutely continuous seal, the edges of the turns of the spiral must define flat planes. One makes these flat planes by passing each end of the spiral under a surface grinder. The strips that form the spiral will have had a nearly constant width, so that the grinder will need to remove only one or two thousandths of an inch. Rigidity of the spiral facilitates the grinding operation, since the grinding occurs before attachment of the end closures. FIG. 5 shows a means for enhancing the rigidity of the spiral.

FIG. 5 shows a fragment of one of the strips used to make the catalytic air cleaner of the present invention. The strip includes a plurality of U-shaped projections 50, attached to the strip along the edge of the strip. The U-shaped projections have a thickness sufficiently small to present negligible resistance to gas, which would flow in the general direction indicated by the arrow. One attaches U-shaped projections 50 to both edges of the strip. U-shaped projections 50 have the same height as projections 3 of FIGS. 1 and 2. One attaches the U-shaped projections 50, at one side only, to the strip, by spot welding. The other side of the U-shaped projections remain unattached temporarily.

One then winds two such strips in the manner described earlier. At this point, the unattached sides of the U-shaped projections abut the next turn of the spiral. One then spot welds the U-shaped projections 50 to the turns of the spiral which overlay those projections. Thus, one forms a rigid structure for grinding. The U-shaped projections 50 need to provide rigidity only during the grinding operation; the end closures, when attached, constitute the major rigiditying elements.

In summary, the catalytic air cleaner of the present invention differs significantly from that shown in U.S. Pat. No. 4,911,894. First, in the present invention, the strips comprise bare metal, and do not have a coating of catalyst. No catalytic combustion occurs along the surface of the strips. Secondly, the heater at the core of the spiral comprises an electrically heated catalytic converter, and all catalytic combustion occurs in the core, and not along the spiral paths.

The present invention eliminates the need for strips of spacers. The metal projections maintain precisely the separation between adjacent turns of the spiral, and do not create the problems associated with use of the spacers, as described earlier. Also, by eliminating the strips of spacer, the width of the flow channel equals the full width of the metal strip.

With the present invention, one can attach the end closures by vacuum brazing, without deactivating a catalyst, since the metal strips contain no catalyst. Of course, one inserts the electrically-heated catalytic converter after performing the brazing. The brazing assures that the air cleaner will comprise a tightly sealed chamber.

The air cleaner of the present invention will destroy bacteria as well as combustible vapors. One may increase the degree of destruction of bacteria by passing the air leaving the spiral through a beam of ultraviolet radiation or through a high efficiency particulate air filter (HEPA). One forms the HEPA filter of glass fibers of submicron diameter, supported by and stuck to larger glass fibers within an organic binder. The HEPA filter can retain particles as small as one micron, the approximate size of bacteria.

Although the above description illustrates the invention with respect to certain embodiments, one can vary the details considerably. One can change the size of the strip, the number of turns, the location and configuration of the ports, and even the cross-sectional shape of the spiral (provided that the air passages do not become blocked), all within the scope of the invention. One should consider such modifications as within the spirit and scope of the following claims.

What is claimed is:

1. A catalytic air cleaner comprising:
   a) a double spiral formed from two metal strips wound together, the spiral defining two flow channels, the spiral having a core, one channel leading into the core of the spiral and the other channel leading out of the core, the strips being substantially free of any catalyst,
   b) an electrically-heated catalytic heater disposed at the core of the spiral, and
   c) closures on each end of the spiral, said closures being joined to the strips that form the spiral.

2. The catalytic air cleaner of claim 1, wherein the strips that form the spiral and the end closures are joined by vacuum brazing.

3. The catalytic air cleaner of claim 1, wherein the strips forming the spiral have a plurality of projections affixed to the strips, the spiral having turns formed by the strips, the turns having a spacing therebetween, and wherein the spacing between the turns of the spiral is maintained by the projections.

4. The catalytic air cleaner of claim 3, wherein the projections comprise pieces of metal formed as arches and welded to the strips, the arches having edges, wherein the arches are arranged such that the edges are presented to air flow through the channels.

5. The catalytic air cleaner of claim 4, wherein the strips also have a plurality of U-shaped projections, distinct from the arches, the strips having edges, the U-shaped projections being arranged along the edges of the strips, and being affixed to the strips.

6. The catalytic air cleaner of claim 3, wherein each strip has a longitudinal axis, wherein the projections define rows, and wherein the rows are positioned such that any line drawn across the strip and perpendicular to the longitudinal axis of the strip intersects a line joining one of said rows.

7. The catalytic air cleaner of claim 1, wherein the strips that form the spiral and the end closures are made of titanium.

8. The catalytic air cleaner of claim 1, wherein at least one end closure includes inlet and outlet ports for connecting the flow channels to a region outside the air cleaner, and wherein at least one end closure includes an opening coincident with the core for providing access to the heater.

9. In a catalytic air cleaner comprising a pair of metal strips wound into a spiral, the spiral defining two flow channels, the spiral having a core, one channel leading into the core of the spiral and the other channel leading out of the core, and closures on each end of the spiral, the improvement wherein the strips are substantially free of any catalyst, and wherein there is an electrically-heated catalytic heater located at the core of the spiral, wherein substantially all catalytic combustion in the air cleaner takes place in the catalytic heater in the core.

10. The improvement of claim 9, wherein the strips and the end closures are joined by vacuum brazing.

11. The improvement of claim 9, wherein the strips forming the spiral have a plurality of projections affixed to the strips, the spiral having turns formed by the strips, the turns having a spacing therebetween, and wherein the spacing between the turns of the spiral is maintained by the projections.

12. The improvement of claim 11, wherein the projections comprise pieces of metal formed as arches and welded to the strips, the arches having edges, wherein the arches are arranged such that the edges are presented to air flow through the channels.

13. The improvement of claim 12, wherein the strips also have a plurality of U-shaped projections, distinct from the arches, wherein the strips have edges, the U-shaped projections being arranged along the edges of the strips, and being affixed to the strips.

14. The improvement of claim 11, wherein each strip has a longitudinal axis, wherein the projections define rows, and wherein the rows are positioned such that any line drawn across the strip and perpendicular to the longitudinal axis of the strip intersects a line joining one of said rows.

15. The improvement of claim 10, wherein at least one end closure includes inlet and outlet ports for connecting the flow channels to a region outside the air cleaner, and wherein at least one end closure includes an opening coincident with the core for providing access to the heater.

16. A method of making a spirally-wound catalytic air cleaner, the method comprising the steps of:
   a) providing a pair of metal strips, the strips being substantially free of any catalyst, the strips having a plurality of projections affixed to the strips, wherein each strip has a longitudinal axis, wherein the projections define rows, and wherein the rows are positioned such that any line drawn across the strip and perpendicular to the longitudinal axis of the strip intersects a line joining one of said rows,
   b) welding a plurality of U-shaped projections, at one side of the U-shaped projections, to at least one edge of both of the strips,
   c) laying the strips over each other and winding the strips into a spiral, wherein the spiral has a plurality of turns,
   d) welding the other sides of the U-shaped projections to the next turn of the spiral,
   e) grinding the edges of the wound strips to form substantially flat planes, at both ends of the spirals, the flat planes being defined by those edges, f) attaching a pair of end closures to the edges along said flat planes, wherein at least one end closure has a central opening, and g) inserting an electrically heated catalytic converter into the central opening, and closing said central opening.

17. The method of claim 16, wherein the attaching step comprises the step of vacuum brazing the end closures to the strips.